(12) United States Patent  
Huehn et al.

(10) Patent No.: US 7,638,044 B2  
(45) Date of Patent: Dec. 29, 2009

(54) AQUARIUM FILTER HOUSING WITH ROUNDED BOTTOM

(75) Inventors: Donald Barry Huehn, Blacksburg, VA (US); Joseph Roark, Blacksburg, VA (US); Jeffrey Warden, Raleigh, NC (US)

(73) Assignee: Tetra Holding (US), Inc., Blacksburg, VA (US)

( * ) Notice: Subject to any disclaimer, the term of this patent is extended or adjusted under 35 U.S.C. 154(b) by 140 days.

(21) Appl. No.: 11/893,367

(22) Filed: Aug. 15, 2007

(65) Prior Publication Data  
US 2009/0045112 A1 Feb. 19, 2009

(51) Int. Cl.  
*A01K 63/04* (2006.01)

(52) U.S. Cl. ............ 210/167.21; 210/167.22; 210/167.27; 119/260

(58) Field of Classification Search ......... 210/167.21, 210/167.22, 167.27, 232; 119/259, 260  
See application file for complete search history.

(56) References Cited

U.S. PATENT DOCUMENTS

| | | | |
|---|---|---|---|
| 3,279,430 A * | 10/1966 | De Vieux Mugridge | 119/259 |
| 4,376,053 A * | 3/1983 | Bullock et al. | 210/767 |
| 4,783,258 A | 11/1988 | Willinger et al. | |
| 5,679,253 A | 10/1997 | Fuerst et al. | |
| 5,965,016 A | 10/1999 | Suchowski et al. | |
| D468,393 S | 1/2003 | Agresta et al. | |
| D494,251 S | 8/2004 | Fox, Jr. et al. | |
| 6,797,163 B2 | 9/2004 | Carley et al. | |
| 2004/0020842 A1 | 2/2004 | Brooks et al. | |
| 2007/0023338 A1 | 2/2007 | Newman | |
| 2009/0045111 A1 | 2/2009 | Huehn | |
| 2009/0045113 A1 | 2/2009 | Newman et al. | |
| 2009/0045114 A1 | 2/2009 | Huehn et al. | |

FOREIGN PATENT DOCUMENTS

DE 4328541 A * 4/1995  
GB 639678 7/1950

OTHER PUBLICATIONS

Exhibit A, Huehn et al., U.S. Appl. No. 11/645,225; "Filter Cartridge"; 24 pgs.; filed Dec. 22, 2006.  
Exhibit B, hydor® PTC *FKIP 250 Thermofilter*; 7 pgs.; Date: Admitted Prior Art.  
Exhibit C, AquaClear Power Filter; Instruction Manual for Models 20, 30, 50, 70 and 110; 9 pgs. (2003).

* cited by examiner

*Primary Examiner*—Fred Prince  
(74) *Attorney, Agent, or Firm*—Merchant & Gould P.C.

(57) ABSTRACT

An aquarium filter having a filter housing with a rounded bottom. The filter housing including a housing input that directs water into an interior chamber such that the water sweeps across the rounded bottom to reduce or eliminate dead spots and reduce particulate settlement.

23 Claims, 8 Drawing Sheets

AQUARIUM FILTER HOUSING WITH ROUNDED BOTTOM

FIELD OF THE INVENTION

The present disclosure relates generally to devices for use in the aquatics industry, and various methods associated with such devices. More particularly, this disclosure relates to a filter housing for use in filtering aquarium water.

BACKGROUND OF THE INVENTION

To maintain an ecological balance within an aquarium, it is necessary to clean the aquarium water. Cleaning is often accomplished by filtering the aquarium water through a filter housing. In the filter housing, water enters a filter chamber, flows through a filter element, and is then returned to the aquarium.

In conventional filter housing arrangements, dead spots or areas of low flow often occur at regions upstream of the filter element. In these dead spots or areas of low flow, particulate material settles out of the water stream; the particulate material typically settling on the bottom floor of the filter housing.

To dispose of the settled and accumulating particulate material, the filter housing must be removed from the aquarium and rinsed at a sink, for example. This procedure can be messy and very inconvenient for the user. Some users choose not to deal with the mess and inconvenience, and accordingly maintain or replace only the filter element. If the settled particulate material is not disposed of regularly, a significant amount of the particulate material can be unintentionally returned to aquarium during filter element maintenance. In particular, when a user lifts the filter element from the filter chamber of the housing and has not taken precautions to shut down the water flow, the displacement of the filter element creates a flow pattern that entrains settled particulate material; the entrained particulate material bypassing the filtering process during such maintenance and returning to the aquarium.

In general, filter devices and arrangements used for filtering aquariums can be improved.

SUMMARY OF THE INVENTION

The present disclosure relates to an aquatic filter including a filter housing and a filtering element. The filter housing is designed to suspend particulates in the water flow to increase particulate filtration/collection. The suspension of particulates is accomplished by a directed water circulation pattern that reduces or eliminates particulate drop-out or settlement. The water circulation pattern is created in an unfiltered water chamber by the construction of the filter housing. The reduction in particulate settlement not only increases the particulate collection/filtration, but also lessens the amount of entrained particulates that are returned to the aquarium when the filter element is removed from the housing during maintenance.

A variety of examples of desirable product features or methods are set forth in part in the description that follows, and in part will be apparent from the description, or may be learned by practicing various aspects of the disclosure. The aspects of the disclosure may relate to individual features as well as combinations of features. It is to be understood that both the foregoing general description and the following detailed description are explanatory only, and are not restrictive of the claimed invention.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 1:
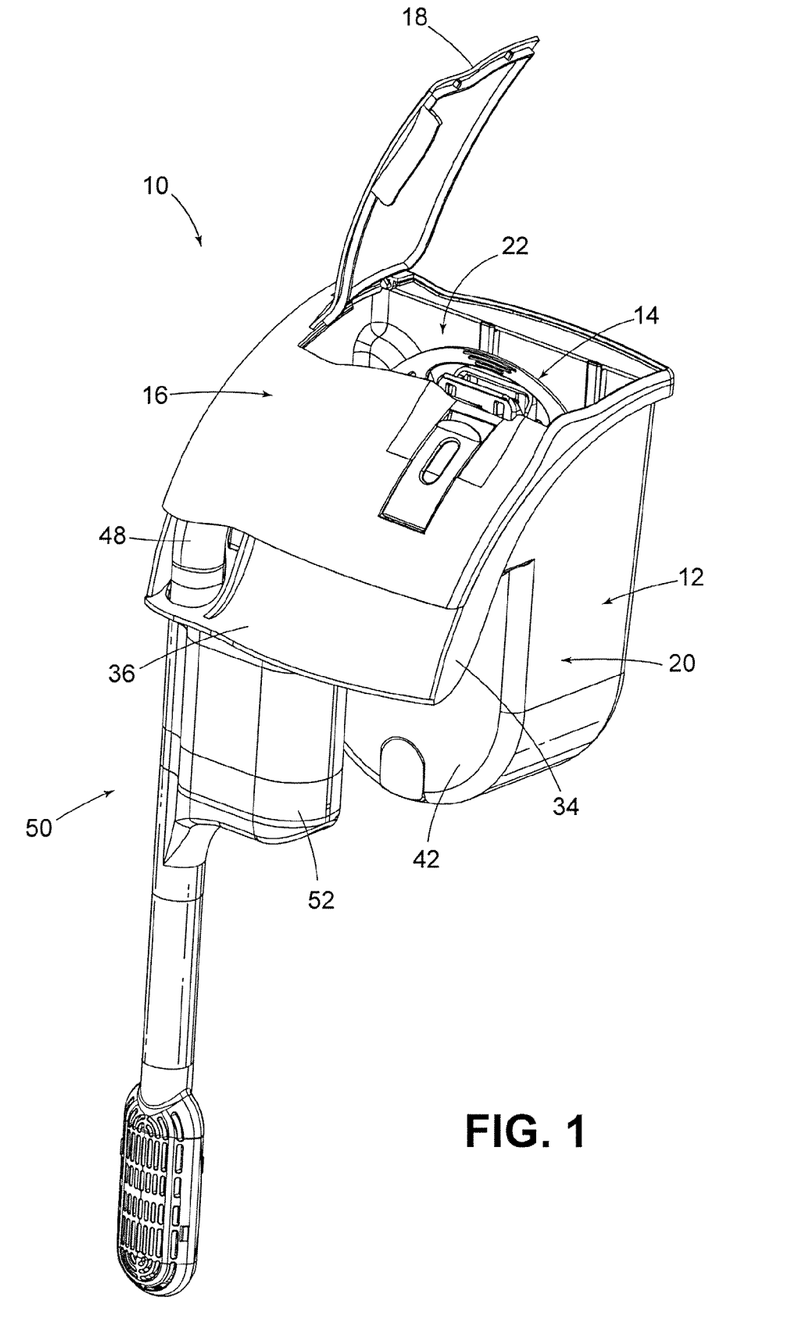
FIG. 1 is front perspective view of an aquarium filter, including a filter housing arranged and constructed in accordance with the principles disclosed.
Figure 2:
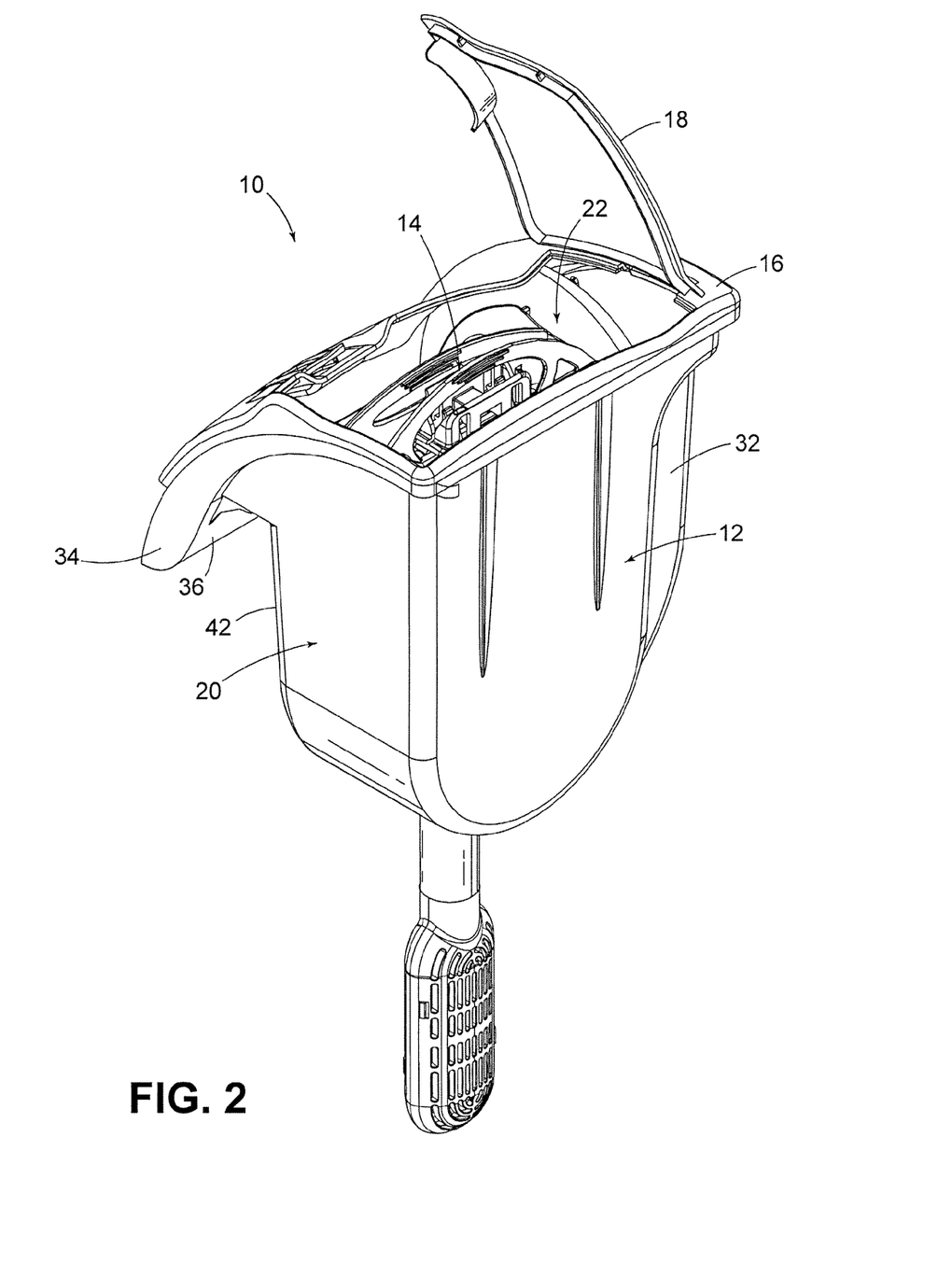
FIG. 2 is a rear perspective view of the aquarium filter of FIG. 1.
Figure 3:
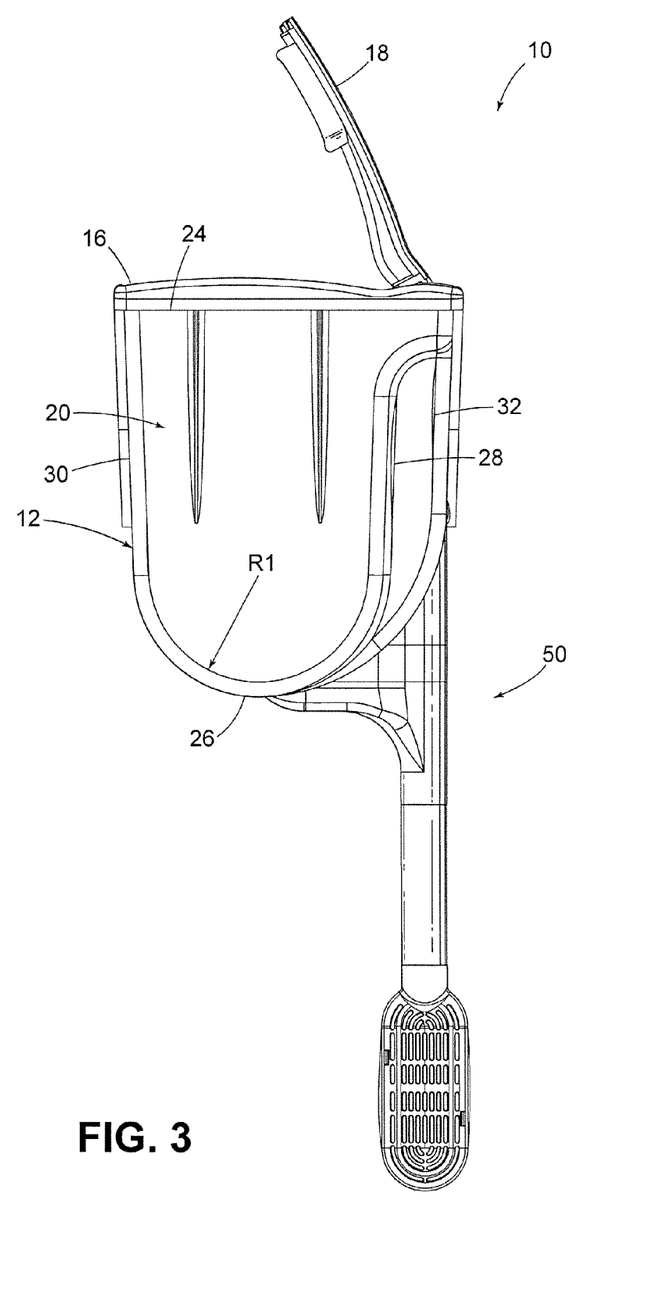
FIG. 3 is a rear elevation view of the aquarium filter of FIG. 2.

FIGS. 1-3 illustrate an aquarium filter 10 having a filter housing 12 in accordance with the principles disclosed. The filter housing 12 of the aquarium filter 10 is sized to receive a filter element or cartridge 14. While the present filter 10 is designed for use in an aquarium, features of the aquarium filter 10 and the filter housing 12 can be used in other water filtration applications, such as in pond filter applications, for example.

As will be described in greater detail hereinafter, the filter housing 12 generally has an internal water flow pathway that reduces dead spots within the housing so that less particulate settles out of the water flow. In particular, the housing 12 is designed so that incoming aquarium water scours or sweeps across the bottom of the housing; the sweeping action suspending particulate material in the water flow and increasing the likelihood of entrapment in the filter cartridge 14.

Figure 4:
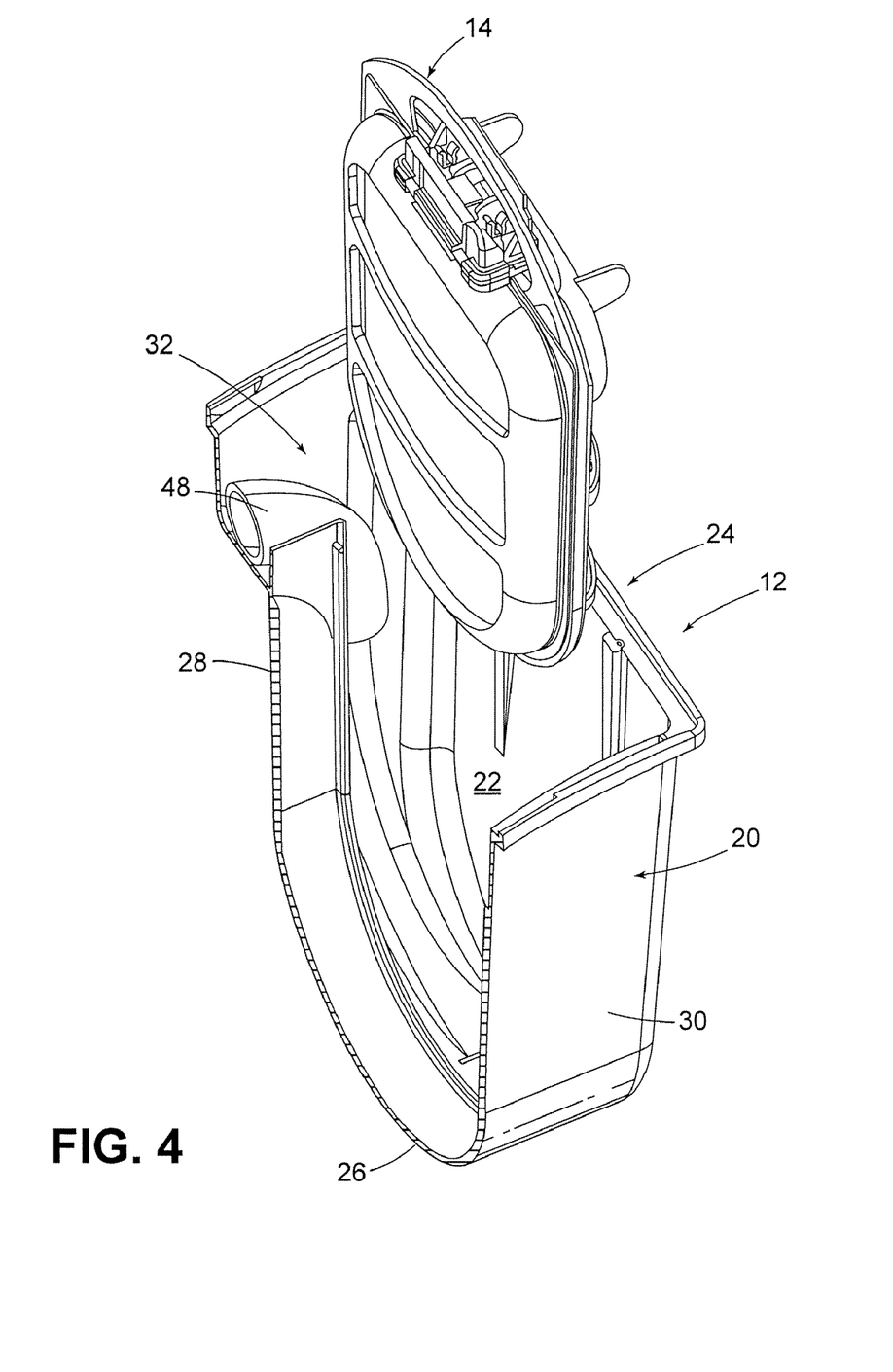
FIG. 4 is a side perspective view of the filter housing and a filter cartridge of the aquarium filter of FIG. 1, the filter housing being illustrated without a front wall portion.

The housing 12 of the disclosed aquarium filter 10 generally includes a main filter housing portion 20 that defines an interior filtering chamber 22 (see also FIG. 4). A filter cover 16 can be positioned over the interior filtering chamber 22 to enclose the cartridge 14 within the housing 12. In the illustrated embodiment, the cover 16 includes a door 18 that provides access to the cartridge 14. The cartridge 14 can be removed from and inserted into the interior filtering chamber 22 through the door 18.

Figure 5:
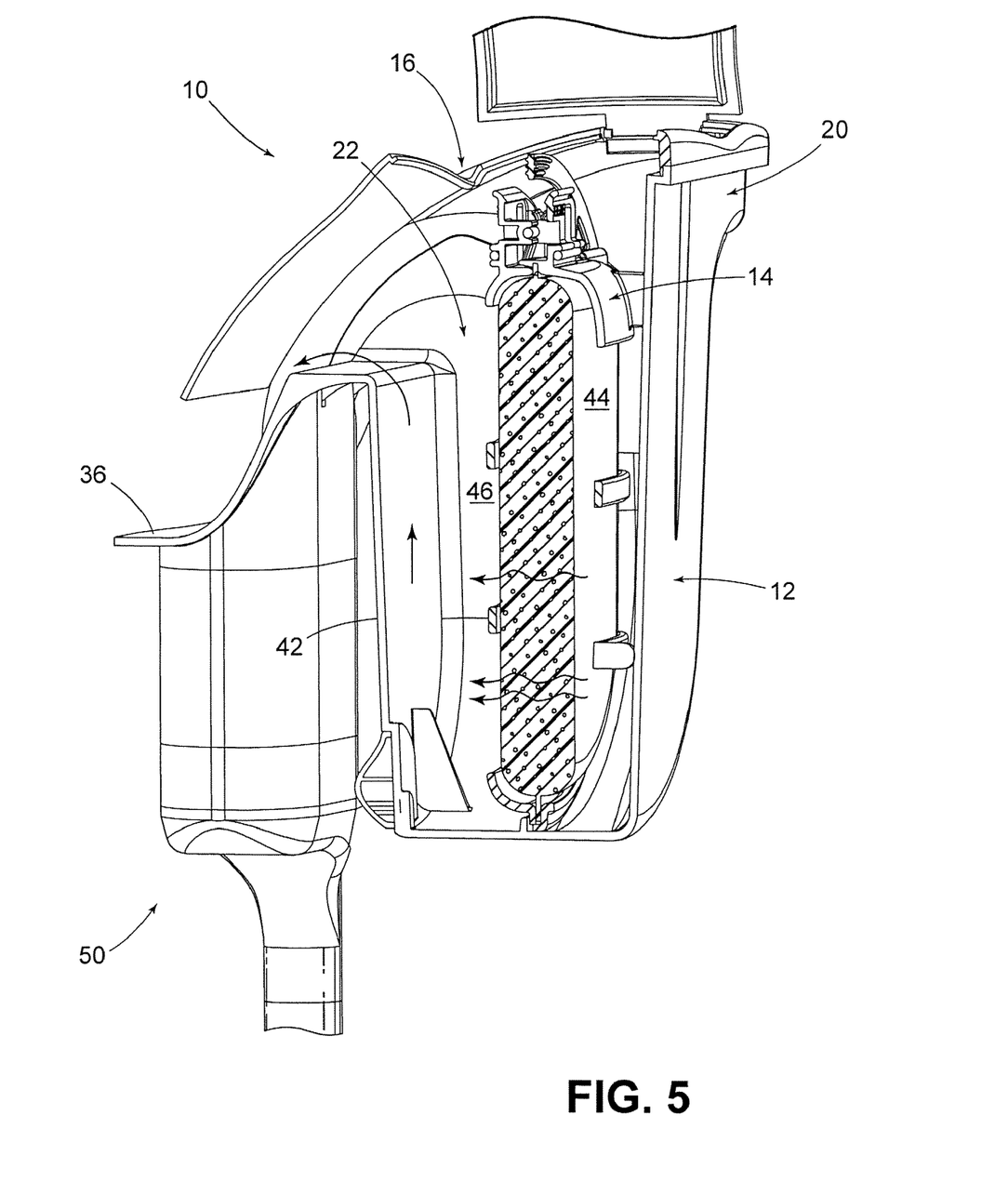
FIG. 5 is a cross-sectional side perspective view of the aquarium filter of FIG. 1.

Referring to FIG. 5, when the cartridge 14 is positioned within the interior filtering chamber 22, the cartridge 14 divides the interior filtering chamber 22 into an upstream, unfiltered water chamber side 44 and a downstream, filtered water chamber side 46. The upstream, unfiltered water chamber side 44 is located rearward of the downstream, filtered water chamber side 46 in the housing 12. In use, water flows by gravity feed from the rearward unfiltered water chamber side 44 through the cartridge 14 to the forward filtered water chamber side 46. Details of example filter cartridges that can be used in the present aquarium filter are described in U.S. Patent applications having Publication Nos. 2009/0045111;

2009/0045114; and 2009/0045113; which applications are incorporated herein by reference.

Referring now to FIGS. 3 and 4, the main filter housing portion 20 of the filter housing 12 has a top 24, a bottom 26, a first side 28, and an opposing second side 30. The top 24 defines an opening (FIG. 4) for receiving the cartridge 14. The first and second sides 28, 30 are generally linear (FIG. 3). The bottom 26 of the main housing portion is rounded. The rounded bottom 26 defines a single radius R1 that extends from the first linear side 28 of the main filter housing portion to the second linear side 30.

Referring again to FIGS. 1-3, the filter housing 12 also defines a housing input 32 (FIGS. 2 and 3) and a housing output 34 (FIG. 1). The input 32 directs water from the aquarium into the interior filtering chamber 22 of the main filter housing portion 20 (i.e., into the unfiltered water chamber side 44). The output 34 directs water from the interior filtering chamber 22 (i.e., the filtered water chamber side 46) back into the aquarium.

In the illustrated embodiment, the output 34 includes a spillway lip 36 (FIGS. 1 and 2) formed in a front wall 42 of the main filter housing portion 20. In use, water flows from the upstream water chamber side 44 through the cartridge 14 and rises within the filtered water chamber side 46 of the housing 12. When the filtered water level reaches the top of the front wall 42 (FIG. 5) of the main housing portion 20, the water spills over the front wall 42 (see arrows in FIG. 5) and runs down the spillway lip 36 back into the aquarium.

Referring again to FIG. 3, the input 32 of the housing 12 is located at one of the sides of the main filter housing portion 20. In the illustrated embodiment, the input 32 is located at the first side 28 of the main filter housing portion 20. Water is drawn from the aquarium into the interior filtering chamber 22 (FIG. 1) through the housing input 32. In particular, and referring to FIG. 1, the aquarium filter 10 includes an intake assembly 50 that is in fluid communication with the housing input 32. The intake assembly 50 includes a motor (not shown) that is contained within a motor housing 52. The motor draws water from the aquarium through an intake tube 48. The intake tube 48 directs the water into the input 32 of the housing 12. As illustrated in FIG. 4, a portion of the intake tube 48 is located within the housing input 32.

Figure 6:
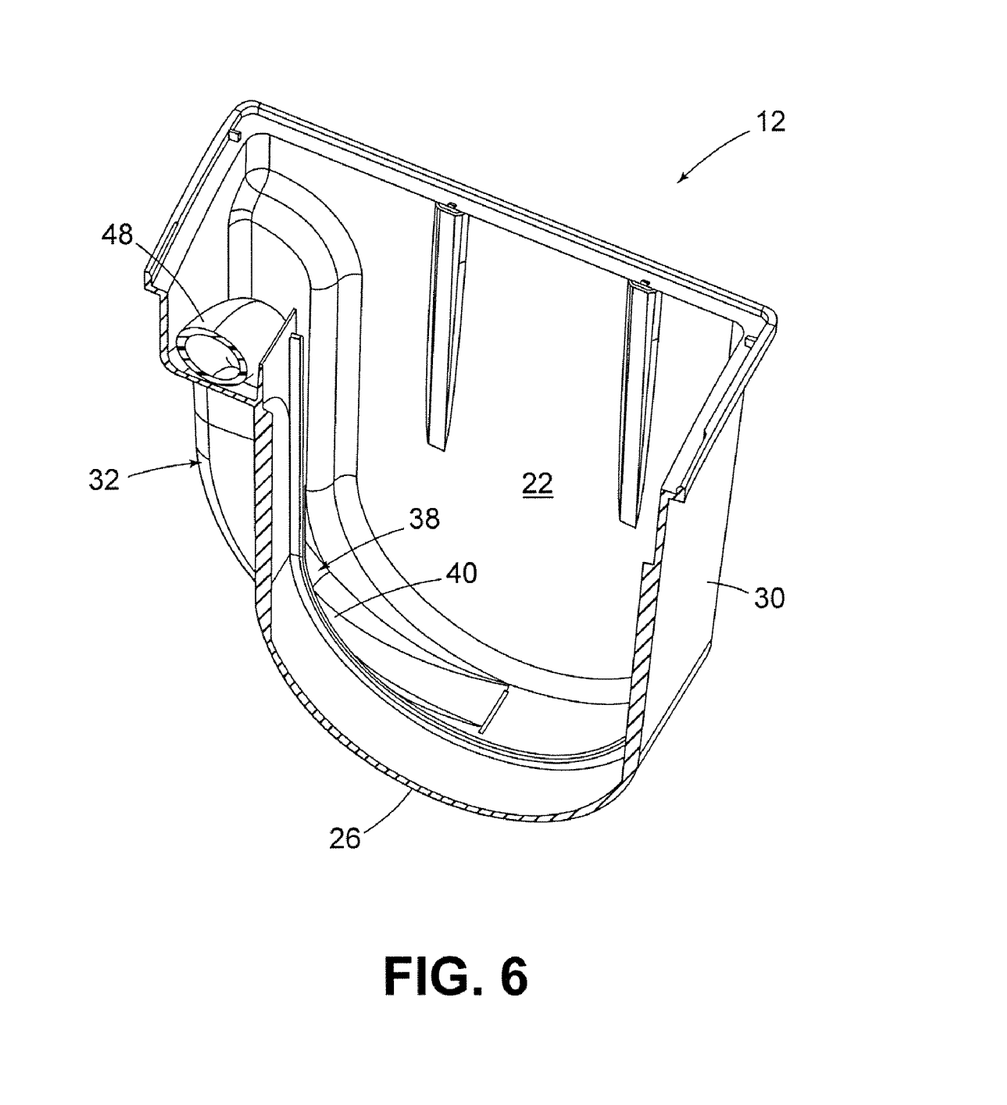
FIG. 6 is a front perspective view of the filter housing of FIG. 4.
Figure 7:
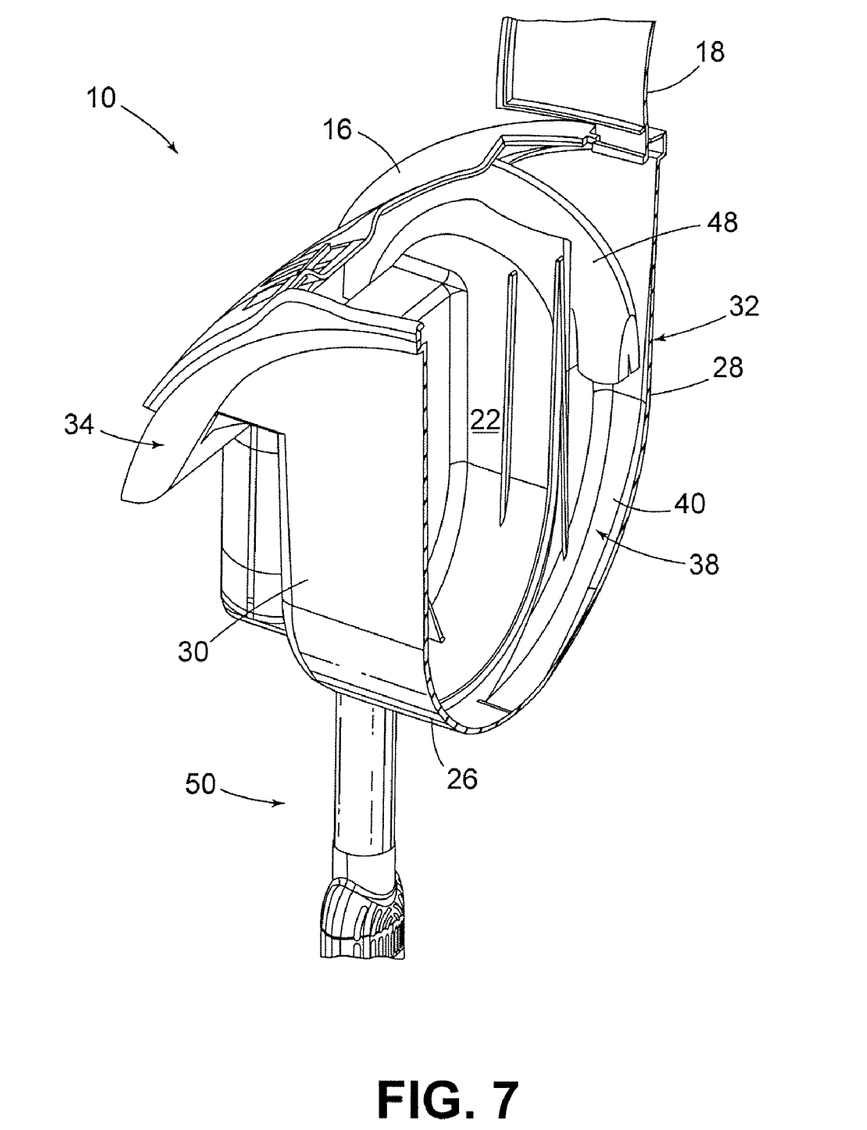
FIG. 7 is a rear perspective view of the filter housing of the aquarium filter of FIG. 1, the filter housing being illustrated without a rear wall portion.
Figure 8:
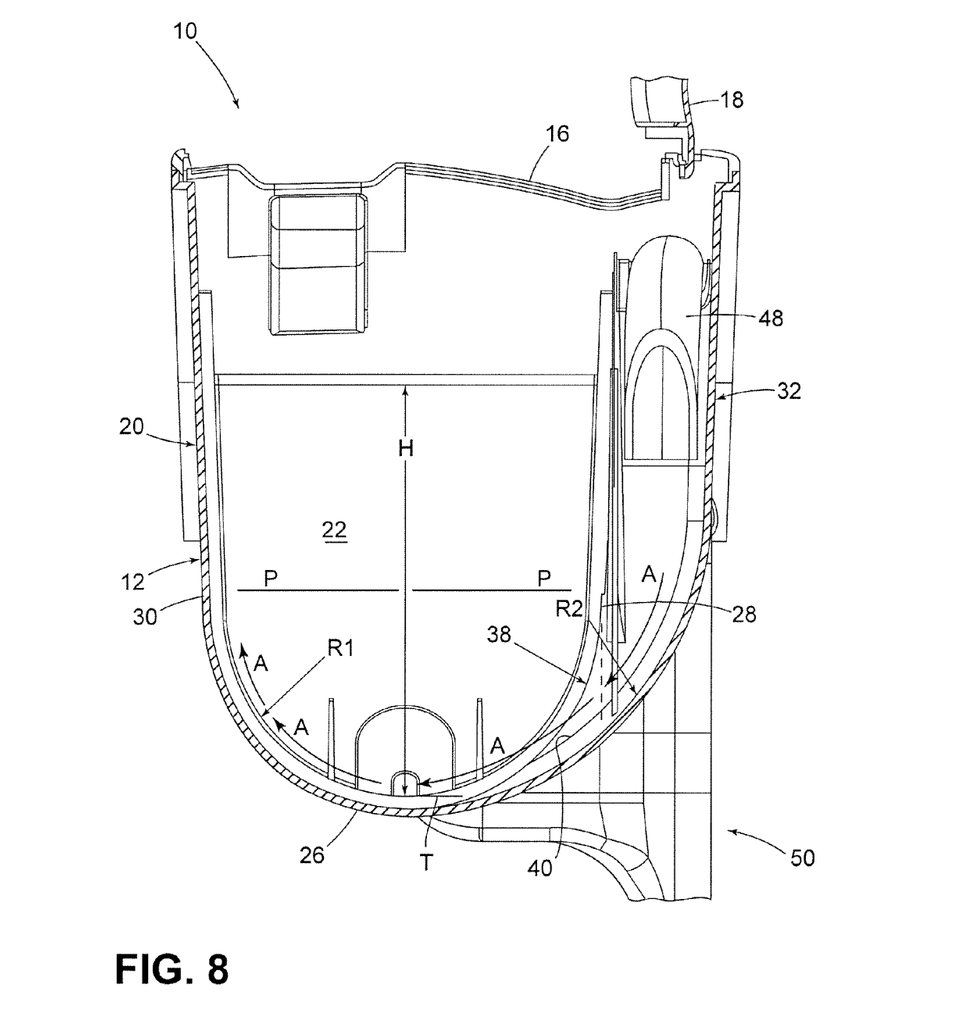
FIG. 8 is a rear elevation view of the filter housing of FIG. 7.

Referring now to FIGS. 6-8, the housing input 32 of the filter housing 12 defines a fluid entrance 38 (i.e., a chamber entrance). The fluid entrance 38 is in fluid communication with the unfiltered water chamber side 44 of the interior filtering chamber 22. The fluid entrance 38 is located at a transition region 40 between the input 32 and the unfiltered water chamber side 44 of the filter housing 12. Referring to FIG. 8, the entrance 38 is defined as the vertical cross-sectional area (shown in dashed line) extending from the first linear side 28 of the main filter housing portion 20, and facing the lower region of the filtering chamber 22 defined by the rounded bottom 26.

Referring to FIGS. 7 and 8, the fluid entrance 38 of the filter housing 12 is located in a lower half of the interior filtering chamber 22. That is, the entrance 38 is located below a plane P (FIG. 8) that bisects the overall height H of the filtering chamber 22. Yet, the fluid entrance 38 is not located at the bottom of the main filter housing portion 20; the entrance 38 is instead generally located a distance above a lowermost region of the rounded bottom 26 adjacent to the first side 28 of the main filter housing portion 20. The location of the fluid entrance 38 in relation to the rounded bottom 26 creates a circulation pattern or water flow pathway that scours or sweeps across the bottom of the housing 12. In the illustrated embodiment, the fluid entrance 38 directs water into the rearward water chamber side 44 of the interior filtering chamber 22 such that the water sweeps across the rounded bottom 26 of the main filter housing portion 20 in a direction from the first side 28 of the main housing portion 20 to the second side 30.

In general, the main filter housing portion 20 and the input 32 define an internal fluid flow pathway. The fluid flow pathway (represented by arrows A in FIG. 8) is U-shaped including a first downwardly curved pathway portion and a second upwardly curved pathway portion. The downwardly curved pathway portion is created in part by the arrangement of the housing input 32 and in part by the radius R1 of the rounded bottom 26 adjacent to the first side 28 of the housing 12. The upwardly curved pathway portion is defined by the radius R1 of the rounded bottom 26 adjacent to the second side 30 of the housing.

Water flowing through the input 32 flows downward through the fluid entrance 38 into the filtering chamber 22. In the filtering chamber 22, the downward flowing water moves in a direction from one side of the main filter housing portion 20 to the other side such that the water sweeps across a substantial majority of the rounded bottom 26 in the unfiltered water chamber side 44 of the filtering chamber 22. This U-shaped water pathway reduces or eliminates dead spots in the housing and maintains the particulates in a suspended state so that a greater percentage of the particulates is filtered by the cartridge 14.

Referring still to FIG. 8, the input 32 of the filter housing 12 has a curved construction. The curved construction defines the fluid entrance 38 to the main housing portion 20 and the transition region 40. The transition region 40 is generally defined by an entrance radius R2 of the curved construction. The entrance radius R2 has a horizontal tangent T that is coplanar with the horizontal tangent of the single radius R1 of the rounded bottom 26. The design of this transition region 40 reduces energy loss and eddy currents, and desirably minimizes or more desirably eliminates any flow-impeding structure so as to maximize the sweeping flow action of the water across the rounded bottom 26.

The enhanced sweeping fluid flow of the disclosed aquarium filter 10 reduces the occurrence of particulate settlement in the bottom of the housing 12. Instead of settling, the particulates are maintained in a suspended state in the rearward water chamber side 46 of the interior filtering chamber 22 before being carried across or through the filter element, thereby increasing the likelihood of particulate entrapment in the cartridge 14. The present aquarium filter accordingly more effectively filters aquarium water during filtering operations.

Yet, by reducing dead spots and settlement, this arrangement also decreases the amount of particulates returned to the aquarium filter during non-filtering operation. For example, when a user removes the cartridge from the filter housing, the content of the unfiltered water chamber side and the filtered water chamber side mix. Because the disclosed filter housing 12 reduces the amount of settlement and increases the percentage of particulate filtration/collection, the housing 12 in turn reduces the amount of entrained particular material unintentionally returned to the aquarium caused by removal of the cartridge.

Referring back to FIG. 3, the exterior constructions of main filter housing portion 20 and the input 32 are designed to display the enhanced fluid flow features of the present aquarium filter 10. In the illustrated embodiment, the housing input 32 has an exterior downward-curving construction that mimics the downwardly curving pathway portion of the internal fluid flow pathway. Likewise, the bottom of the main filter housing portion 20 has a rounded or curved exterior construction that mimics the U-shaped of the internal fluid flow pathway. These exterior constructions of the filter housing 12 aid a user in understanding the internal fluid flow pathway, and thereby aid the user in better understanding of the overall operation of the aquarium filter 10.

The above specification provides a complete description of the present invention. Since many embodiments of the invention can be made without departing from the spirit and scope of the invention, certain aspects of the invention reside in the claims hereinafter appended.

What is claimed is:

1. A filter housing arrangement, comprising:
   a) a main filter housing portion defining an interior filtering chamber, the main filter housing portion having a top, a rounded bottom, and opposing first and second sides, the top defining an opening for receiving a filter cartridge, the rounded bottom defining a single radius that extends from the first side of the main filter housing portion to the second side; and
   b) a housing input that directs water from an aquarium into the interior filtering chamber of the main filter housing portion, the housing input defining a chamber entrance in fluid communication with the interior filtering chamber;
   c) wherein incoming water flows through the housing input in a first direction generally parallel to the first side of the main filter housing and then through the chamber entrance into the interior filtering chamber in a direction from the first side of the main filter housing portion to the second side such that the incoming water sweeps across the rounded bottom of the main filter housing portion.

2. The filter housing arrangement of claim 1, wherein the chamber entrance of the housing input is located in a lower half of the interior filtering chamber.

3. The filter housing arrangement of claim 2, wherein the chamber entrance of the housing input is located a distance above a lowermost region of the rounded bottom of the main filter housing portion.

4. The filter housing arrangement of claim 1, wherein the main filter housing portion and the housing input define a fluid flow pathway, the pathway having a U-shaped pathway portion that sweeps across the rounded bottom of the main filter housing portion.

5. The filter housing arrangement of claim 4, wherein the chamber entrance of the housing input is located at a curved transition region that partly defines a downward flowing portion of the fluid flow pathway.

6. The filter housing arrangement of claim 1, wherein the main filter housing portion and the housing input define an internal water pathway, the housing input having a curved exterior construction that mimics a downward curving portion of the internal water pathway, the main filter housing portion having a curved exterior construction that mimics a U-shaped portion of the internal water pathway.

7. The filter housing arrangement of claim 1, further including a housing output that directs water from the main filter housing portion back into the aquarium, the housing output including a spillway lip.

8. The filter housing arrangement of claim 1, wherein the interior filtering chamber is divided into an upstream chamber and a downstream chamber when a filter cartridge is positioned within the interior filtering chamber, the upstream chamber being located rearward of the downstream chamber, the chamber entrance directing water into the rearward upstream chamber during filtering operations.

9. The filter housing arrangement of claim 1, wherein the housing input includes an intake tube through which the incoming water flows in a downward direction generally parallel to the first side of the main filter housing portion.

10. A filter housing arrangement, comprising:
    a) a main filter housing portion defining an interior filtering chamber, the main filter housing portion having a top opening, a rounded bottom, and opposing sides; and
    b) a housing input that directs water from an aquarium into the interior filtering chamber, the housing input including an intake tube through which incoming water flows in a downward direction generally parallel to one of the opposing sides of the main filter housing portion;
    c) wherein the main filter housing portion and the housing input define a fluid flow pathway, the pathway having a first pathway portion generally parallel to the one side of the main filter housing portion and a U-shaped pathway portion that sweeps across the rounded bottom of the main filter housing portion from the one side of the main filter housing portion to the other side.

11. The filter housing arrangement of claim 10, wherein housing input defines a fluid entrance that directs water into the interior filtering chamber, the fluid entrance being located a distance above a lowermost region of the rounded bottom of the main filter housing portion.

12. The filter housing arrangement of claim 11, wherein the fluid entrance of the housing input is located in a lower half of the interior filtering chamber.

13. The filter housing arrangement of claim 12, wherein the fluid entrance has a curved construction that partly defines a downward flowing portion of the fluid flow pathway.

14. The filter housing arrangement of claim 10, further including a housing output that directs water from the main filter housing portion back into the aquarium, the housing output including a spillway lip.

15. The filter housing arrangement of claim 10, wherein the fluid flow pathway further includes a downward curving pathway portion, the housing input having a curved exterior construction that mimics the downward curving pathway portion of the fluid flow pathway, the main filter housing portion having a curved exterior construction that mimics the U-shaped pathway portion of the fluid flow pathway.

16. The filter housing arrangement of claim 10, wherein the interior filtering chamber is divided into an upstream chamber and a downstream chamber when a filter cartridge is positioned within the interior filtering chamber, the upstream chamber being located rearward of the downstream chamber, the housing input directing water into the rearward upstream chamber during filtering operations.

17. A filter housing arrangement, comprising:
    a) a filter housing having a top and a bottom, the filter housing defining an interior filtering chamber; and
    b) a housing input that directs water from an aquarium into the interior filtering chamber;
    c) the filter housing and the housing input defining an internal water pathway, wherein the housing input has a curved exterior construction that mimics a downward curving portion of the internal water pathway, and wherein the filter housing has a curved exterior construction that mimics a U-shaped portion of the internal water pathway.

18. The filter housing arrangement of claim 17, wherein the housing input defines a chamber entrance that directs water into the interior filtering chamber, the chamber entrance being located in a lower half of the interior filtering chamber.

19. The filter housing arrangement of claim 18, wherein the chamber entrance of the housing input is located a distance above a lowermost region of the bottom of the filter housing.

20. The filter housing arrangement of claim 17, wherein the housing input includes an intake tube through which incoming water flows in a downward direction toward the interior filtering chamber.

21. A filter housing arrangement, comprising:
a) a main filter housing portion defining an interior filtering chamber, the main filter housing portion having a top, a rounded bottom, and opposing first and second sides, the top defining an opening for receiving a filter cartridge, the rounded bottom defining a single radius that extends from the first side of the main filter housing portion to the second side;
b) a housing input that directs water from an aquarium into the interior filtering chamber of the main filter housing portion, the housing input defining a chamber entrance in fluid communication with the interior filtering chamber; and
c) a housing output that directs water from the main filter housing portion back into the aquarium, the housing output including a spillway lip;
d) wherein the chamber entrance directs water into the interior filtering chamber such that the incoming water sweeps across the rounded bottom of the main filter housing portion in a direction from the first side of the main filter housing portion to the second side.

22. A filter housing arrangement, comprising:
a) a main filter housing portion defining an interior filtering chamber, the main filter housing portion having a top opening, a rounded bottom, and opposing sides;
b) a housing input that directs water from an aquarium into the interior filtering chamber; and
c) a housing output that directs water from the main filter housing portion back into the aquarium, the housing output including a spillway lip;
d) wherein the main filter housing portion and the housing input define a fluid flow pathway, the pathway having a U-shaped pathway portion that sweeps across the rounded bottom of the main filter housing portion from one side of the main filter housing portion to the other side.

23. A filter housing arrangement, comprising:
a) a filter housing having a top and a bottom, the filter housing defining an interior filtering chamber;
b) a housing input that directs water from an aquarium into the interior filtering chamber; and
c) a housing output that directs water from the filter housing back into the aquarium, the housing output including a spillway lip;
d) the filter housing and the housing input defining an internal water pathway, wherein the housing input has a curved exterior construction that mimics a downward curving portion of the internal water pathway, and wherein the filter housing has a curved exterior construction that mimics a U-shaped portion of the internal water pathway.

* * * * *